(12) United States Patent
Miyamoto et al.

(10) Patent No.: US 10,288,959 B2
(45) Date of Patent: May 14, 2019

(54) DISPLAY DEVICE COMPRISING FIRST AND SECOND OXIDE CONDUCTIVE FILMS THAT COVER A TERMINAL WIRE

(71) Applicant: Japan Display Inc., Tokyo (JP)

(72) Inventors: Motoharu Miyamoto, Tokyo (JP); Hidetatsu Nakamura, Tokyo (JP); Yasuhiro Kanaya, Tokyo (JP); Yasushi Nakano, Tokyo (JP); Yasuhito Aruga, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/668,747

(22) Filed: Aug. 4, 2017

(65) Prior Publication Data

US 2018/0046012 A1    Feb. 15, 2018

(30) Foreign Application Priority Data

Aug. 10, 2016  (JP) .................. 2016-157394

(51) Int. Cl.
| G02F 1/1333 | (2006.01) |
| G02F 1/1337 | (2006.01) |
| G02F 1/1343 | (2006.01) |
| G02F 1/1345 | (2006.01) |
| G02F 1/1362 | (2006.01) |
| G02F 1/1368 | (2006.01) |

(52) U.S. Cl.
CPC ...... *G02F 1/13452* (2013.01); *G02F 1/13439* (2013.01); *G02F 1/13458* (2013.01); *G02F 1/133345* (2013.01); *G02F 1/136213* (2013.01); *G02F 1/136286* (2013.01); *G02F 1/1362* (2013.01); *G02F 1/1368* (2013.01); *G02F 1/133707* (2013.01); *G02F 2201/121* (2013.01); *G02F 2201/123* (2013.01); *G02F 2202/16* (2013.01)

(58) Field of Classification Search
CPC ....... G02F 1/13458; G02F 2001/13456; H01L 2224/50; H01L 2225/107
See application file for complete search history.

(56) References Cited

U.S. PATENT DOCUMENTS

| 8,879,036 B2 * | 11/2014 | Sasaki ............... G02F 1/134363 349/139 |
| 2008/0143909 A1 * | 6/2008 | Lee, II .................. G02F 1/1368 349/46 |
| 2008/0149937 A1 * | 6/2008 | Moriwaki ......... G02F 1/136227 257/72 |

(Continued)

FOREIGN PATENT DOCUMENTS

| JP | 2010-85551 A | 4/2010 |
| JP | 2010085551 A | * 4/2010 |

*Primary Examiner* — Paul C Lee
(74) *Attorney, Agent, or Firm* — Typha IP LLC (57) ABSTRACT

A terminal structure that keeps the resistance of its connecting portion small and secures mechanical reliability is to be achieved. A display device includes a display region and a terminal region. A terminal formed in the terminal region is formed with a terminal metal, a first oxide conductive film covering the end portion of the terminal metal, and a second oxide conductive film covering the first oxide conductive film and the terminal metal. The first oxide conductive film has an opening in the center part of the terminal.

18 Claims, 9 Drawing Sheets

(56) References Cited

U.S. PATENT DOCUMENTS

| | | | |
|---|---|---|---|
| 2010/0163284 A1* | 7/2010 | Tanahara | G02F 1/133351 174/255 |
| 2012/0120616 A1* | 5/2012 | Katsui | G02F 1/136286 361/748 |
| 2014/0131719 A1* | 5/2014 | Nishino | G02F 1/13458 257/72 |
| 2015/0004760 A1* | 1/2015 | Kim | G02F 1/13338 438/158 |

\* cited by examiner

| TERMINAL | EMBODIMENT 1 | EMBODIMENT 2 | EMBODIMENT 3 |
|---|---|---|---|
| COG OUT (30) | FIG. 10 | FIG. 7 | FIG. 7 |
| COG IN (20) | FIG. 10 | FIG. 10 | FIG. 10 |
| FOG (10) | FIG. 10 | FIG. 10 | FIG. 7 |

DISPLAY DEVICE COMPRISING FIRST AND SECOND OXIDE CONDUCTIVE FILMS THAT COVER A TERMINAL WIRE

CLAIM OF PRIORITY

The present application claims priority from Japanese Patent Application JP 2016-157394 filed on Aug. 10, 2016, the content of which is hereby incorporated by reference into this application.

BACKGROUND

The present disclosure relates to a display device, and more specifically to a display device that prevents an increase in the resistance of its terminal portion and improves the reliability of connection.

Liquid crystal display devices have a configuration including a TFT substrate, a counter substrate disposed opposed to the TFT substrate, and a liquid crystal sandwiched between the TFT substrate and the counter substrate, in which pixels including a pixel electrode, a thin film transistor (TFT), and other elements are formed on the TFT substrate in a matrix configuration. Images are formed by controlling the transmittance of light by liquid crystal molecules for each pixel.

There is a configuration in which on the TFT substrate, wires are connected between layers via through holes. In the through hole, stress is prone to occur, causing the insulating film to be prone to be peeled off.

Japanese Unexamined Patent Application Publication No. 2010-85551 describes a configuration to take measures against the phenomenon of peeling an inorganic insulating film, in which a through hole is formed on a thick organic passivation film, an inorganic insulating film is formed to cover this through hole, and a through hole is formed on the inorganic passivation film to connect a pixel electrode to a TFT substrate. The configuration described in Japanese Unexamined Patent Application Publication No. 2010-85551 is to prevent the inorganic insulating film from being peeled off in the through hole by a method in which in the through hole formed in the organic passivation film, a first ITO is formed between the inorganic insulating film and the organic passivation film, a second ITO is formed on the inorganic passivation film, and the inorganic insulating film is sandwiched between the ITOs.

SUMMARY

In liquid crystal display devices or organic electroluminescent (EL) display devices, for example, a display region and a terminal region are formed. The terminal region is connected to a semiconductor chip that drives the display device and to a flexible circuit board that externally supplies power, picture signals, and other signals to the semiconductor chip. The semiconductor chip is connected to a terminal formed on the TFT substrate using an anisotropic conductive film, for example. This mounting is referred to as Chip On Glass (COG). The flexible circuit board is connected to a terminal formed on the TFT substrate using an anisotropic conductive film, for example. This mounting is referred to as Film On Glass (FOG).

Since such COG or FOG mounting is exclusively performed by thermocompression bonding, mechanical stress is applied. The terminal portion is exposed to external environments unlike the inside of the display region. Therefore, the terminal portion is required to be mechanically highly reliable as well. On the other hand, the terminal portion is required to have a small electrical resistance of the connecting portion.

An object of the present disclosure is to achieve a terminal structure that keeps the resistance of its connecting portion small and secures mechanical reliability.

The present disclosure is to overcome the objet, and has specific schemes below.

(1) A display device includes: a display region and a terminal region. In the display device, a terminal formed in the terminal region is formed with a terminal wire electrically connected to a wire in the display region, a terminal metal formed on the terminal wire, a first oxide conductive film covering an end portion of the terminal metal, and a second oxide conductive film covering the first oxide conductive film and the terminal metal. The first oxide conductive film has an opening on the terminal metal, and the terminal metal is electrically connected to the second oxide conductive film through the opening.

(2) A liquid crystal display device includes: a first substrate; a second substrate; and a liquid crystal layer between the first substrate and the second substrate. In the liquid crystal display device, the first substrate has a display region and a terminal region. In the display region, a plurality of scanning lines, a plurality of picture signal lines, and a plurality of pixels region surrounded by the scanning lines and the picture signal lines are formed. In the pixel region, a pixel electrode and a common electrode are formed. In the terminal region, a terminal wire electrically connected to the scanning line and/or the picture signal line, a terminal metal formed on the terminal wire, a first oxide conductive film covering an end portion of the terminal metal, and a second oxide conductive film covering the first oxide conductive film and the terminal metal are formed. The first oxide conductive film has an opening on the terminal metal, and the terminal metal is electrically connected to the second oxide conductive film through the opening.

DETAILED DESCRIPTION

In the following, the content of the present disclosure will be described in detail with reference to an embodiment. In the following description, a liquid crystal display device will be described by example. However, the present disclosure is also applicable to organic EL display devices.

First Embodiment

Figure 1:
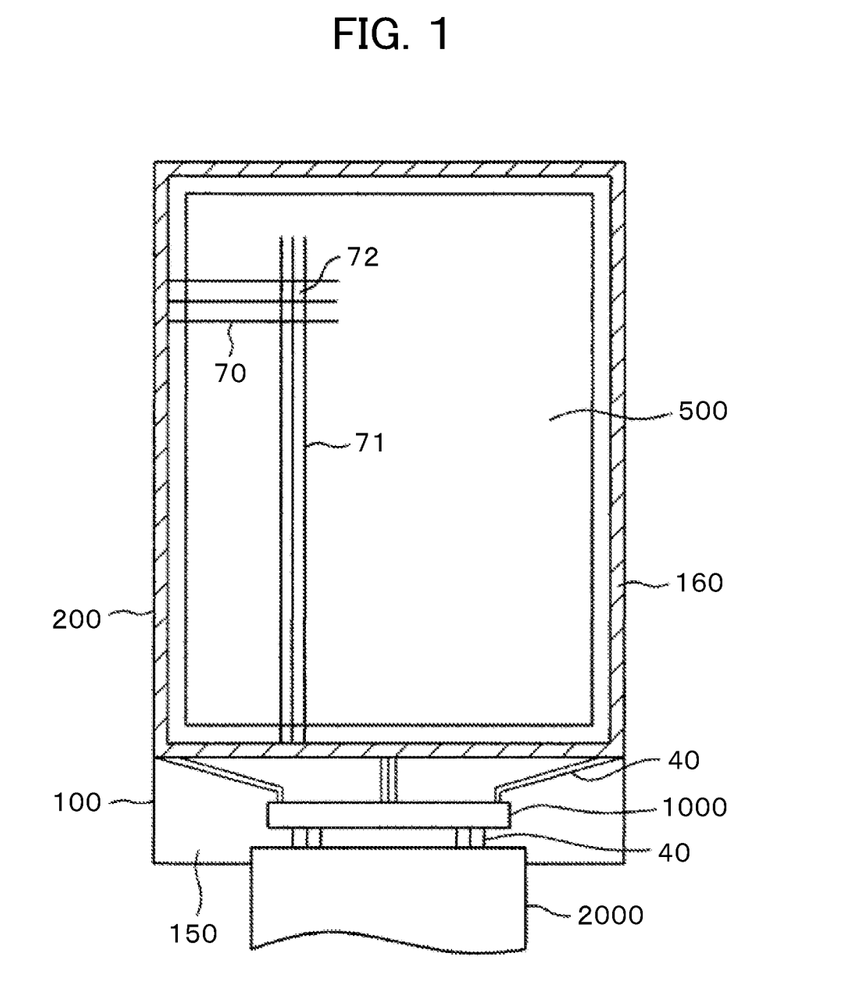
FIG. 1 is a plan view of a liquid crystal display device according to the present disclosure.

FIG. 1 is a plan view of an exemplary liquid crystal display panel to which the present disclosure is applied. In FIG. 1, a TFT substrate 100 is attached to a counter substrate 200 with a sealing material 160, and a liquid crystal is sandwiched between the TFT substrate 100 and the counter substrate 200. A display region 500 is formed between the substrates. The TFT substrate 100 is formed greater than the counter substrate 200. In the region in which the TFT substrate 100 is not overlapped with the counter substrate 200, a terminal region 150 is formed.

In the display region 500, scanning lines 70 extend in the lateral direction, and the scanning lines 70 are arranged in the vertical direction at predetermined gaps. Picture signal lines 71 extend in the vertical direction, and the picture signal lines 71 are arranged in the lateral direction at predetermined gaps. In the region surrounded by the scanning lines 70 and the picture signal lines 71, a pixel 72 is formed. In the present specification, the present disclosure will be described based on a so-called In Plane Switching (IPS) liquid crystal display device excellent in the viewing angle characteristics. However, the present disclosure is not limited to the IPS liquid crystal display device. The present disclosure is also applicable to other liquid crystal display devices including organic EL display device, for example. The IPS pixel configuration will be described later.

To the terminal region 150, a semiconductor chip 1000 that drives the liquid crystal display panel is connected using an anisotropic conductive film, for example. To the terminal region 150, a flexible circuit board 2000 that supplies power and signals to the semiconductor chip 1000 is connected using an anisotropic conductive film, for example. The scanning lines 70 and the picture signal lines 71 in the display region 500 are connected to the semiconductor chip 1000 through terminal wires 40. The flexible circuit board 2000 is connected to the semiconductor chip 1000 through terminal wires 40.

Figure 2:
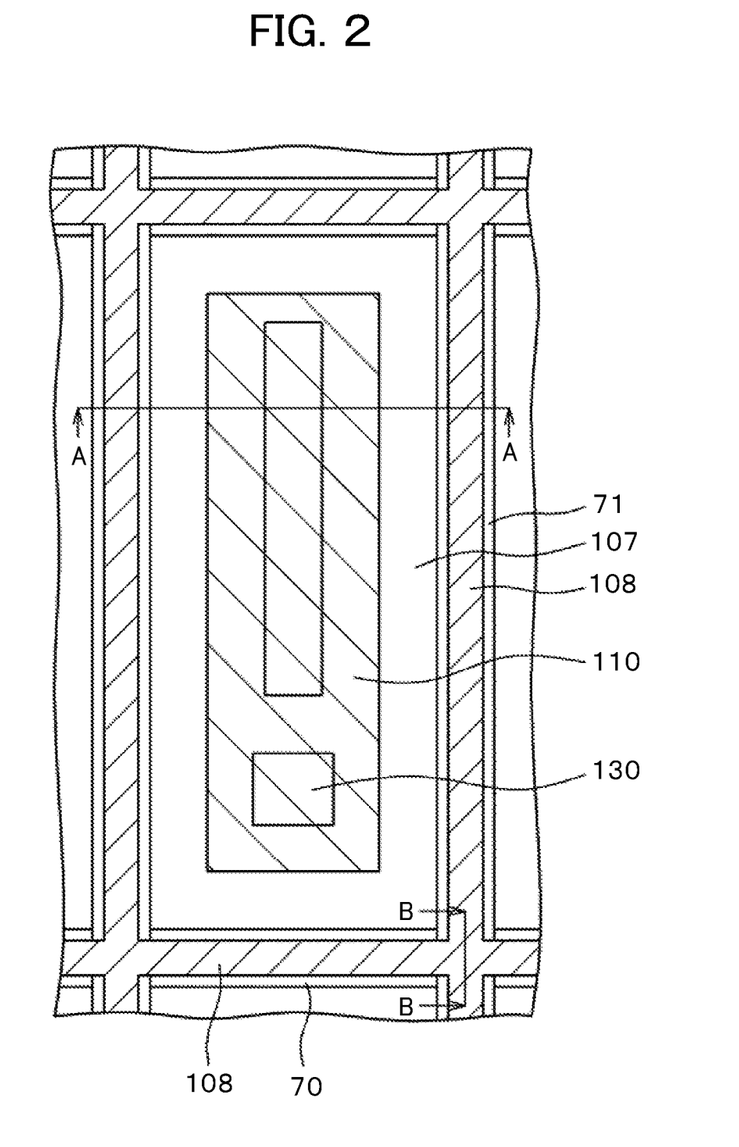
FIG. 2 is a plan view of a pixel portion.

The terminal region 150 is formed simultaneously with the display region 500. Therefore, the layer structure in the display region 500 will be first described. FIG. 2 is a plan view of the pixel 72 in FIG. 1. In FIG. 2, the scanning lines 70 extend in the lateral direction, and are arranged in the vertical direction. The picture signal lines 71 extend in the vertical direction, and are arranged in the lateral direction. The region surrounded by the scanning lines 70 and the picture signal lines 71 is a pixel where a pixel electrode 110 is present. The pixel electrode 110 is formed of indium tin oxide (ITO), which is a transparent oxide conductive film. In a through hole 130, the pixel electrode 110 is connected to a TFT that is a switching element for controlling the timing to apply picture signals from the picture signal lines 71 to the pixel electrode 110. In FIG. 2, for simplicity of the drawing, the other structures, e.g. the configurations of various layers connecting a semiconductor layer or TFT to the pixel electrode, are omitted.

In FIG. 2, below the pixel electrode 110, a common electrode 107 is formed flat through an insulating film. The common electrode 107 is the electrode that makes a pair with the pixel electrode 110. A reference potential is applied to the common electrode 107 with respect to the pixel electrode 110 to which picture signals are applied. The common electrode 107 is formed on throughout the surface of the display region across a plurality of pixels except the through holes 130. The common electrode 107 is formed of ITO, which is a transparent conductive film. ITO has resistance larger than that of metals, and it is difficult to form ITO thick for securing the transmittance of the screen. Thus, ITO has a problem of a drop in the voltage applied to the common electrode 107.

In FIG. 2, in order to prevent a voltage drop in the common electrode 107, a common metal wire 108 is formed overlapped with the scanning line 70 or the picture signal line 71 in a planar view. In FIG. 2, an example is shown in which the common metal wire 108 is overlapped with both of the scanning line 70 and the picture signal line 71. However, the common metal wire 108 may be overlapped with only any one of the scanning line 70 and the picture signal line 71. In FIG. 2, the width of the common metal wire 108 is formed slightly narrower than the width of the scanning line 70 or the picture signal line 71. However, the width of the common metal wire 108 is sometimes formed equal to the width of the scanning line 70 or the picture signal line 71 or formed slightly greater than the width of the scanning line 70 or the picture signal line 71. Since the regions of the scanning line 70 and the picture signal line 71 do not originally contribute to the transmittance, the transmittance of the screen is not degraded even though the common metal wire 108 is formed.

Figure 3:
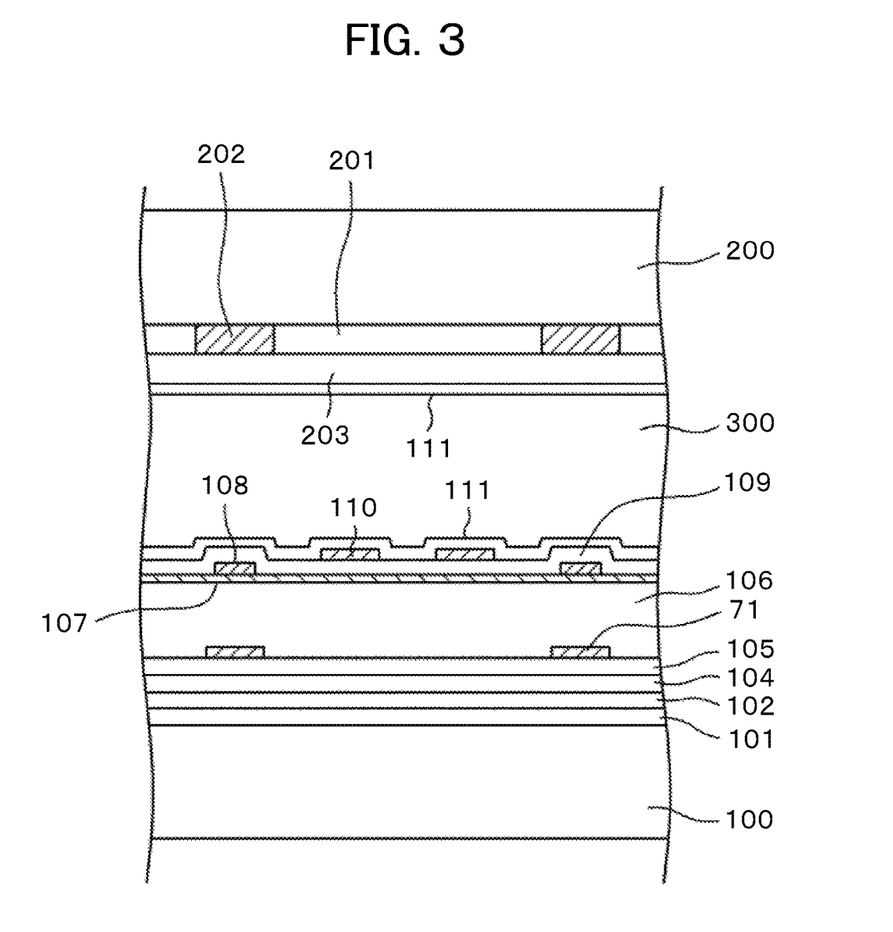
FIG. 3 is a cross sectional view of the liquid crystal display device corresponding to a cross section taken along line A-A in FIG. 2.

FIG. 3 is a cross sectional view of the liquid crystal display device corresponding to a cross section taken along line A-A in FIG. 2. In FIG. 3, on the TFT substrate 100 formed of glass, a first base film 101 made of SiN and a second base film 102 made of $SiO_2$ are formed by chemical vapor deposition (CVD). The first and the second base films 101 and 102 are responsible for preventing impurities from the glass substrate 100 from contaminating a semiconductor layer 103 illustrated in FIG. 4.

In FIG. 3, a gate insulating film 104 is formed on the second base film 102, and an interlayer insulating film 105 is formed on the gate insulating film 104. The interlayer insulating film 105 is used as a protective film also in the terminal region. On the interlayer insulating film 105, the picture signal lines 71 extend in the vertical direction to the paper surface of FIG. 3. The picture signal line 71 has an Al alloy as a main component for decreasing resistance. In order to stabilize the connection to other electrodes and to prevent hillocks from being produced from the Al alloy, a wire having an Al alloy covered with a refractory metal from the top and the bottom is used. Examples of the Al alloy to be used include Al—Si and Al—Cu alloys. Examples of the refractory metal to be used include a Mo alloy, W alloy, Cr alloy, and Ti. As described later, since terminal metals 50 are formed simultaneously when the picture signal lines 71 are formed, the terminal metal 50 has the same layer structure as that of the picture signal line 71.

An organic passivation film 106 is formed covering the picture signal line 71. Since the organic passivation film 106 is responsible for a planarization film and for decreasing the stray capacitance across the common electrode 107 and the picture signal line 71, the organic passivation film 106 is formed as thick as a thickness of 2 to 4 μm. On the organic passivation film 106, the common electrode 107 is formed flat with ITO, which is a transparent oxide conductive film. The common electrode 107 is formed in a thickness of about 50 nm, shared by the pixels. Although ITO is a conductive film, ITO has a resistivity larger than that of metals, and hence ITO has a problem of a drop in the common voltage in the inside of the display region.

In order to take measures against this drop, the common metal wire 108 is formed in contact with the common electrode 107 along the picture signal line 71 in a planar view. Since the common metal wire 108 is formed along the picture signal line 71, the transmittance is not degraded. In FIG. 3, the width of the common metal wire 108 is narrower than the width of the picture signal line 71. However, the width of the common metal wire 108 may be equal to the width of the picture signal line 71, or may be slightly wider than the width of the picture signal line 71 to the extent that the transmittance is not affected.

Since the common metal wire 108 has to have a small resistance, an Al alloy is used. The common metal wire 108 is often formed with a metal the same as the metal of the picture signal line 71. That is, the common metal wire 108 has a configuration in which the top and the bottom of an Al alloy are sandwiched with a refractory metal, such as a Mo alloy, W alloy, Cr alloy, and Ti. Therefore, when the common metal wire 108 is patterned, the terminal metal, which is formed in the same layer structure as that of the picture signal line 71, has to be protected in the terminal region.

A capacitive insulating film 109 is formed of SiN, for example, covering the common electrode 107 and the common metal wire 108. This capacitive insulating film 109 is used as a protective film also in the terminal region. On the capacitive insulating film 109, the pixel electrode 110 in a comb-teeth shape is formed of ITO, which is a transparent conductive film. The planar shape of the pixel electrode 110 is as illustrated by example in FIG. 2. A retention capacitance is formed across the pixel electrode 110 and the common electrode 107 through the capacitive insulating film 109. An alignment film 111 is formed covering the pixel electrode 110 and the capacitive insulating film 109. The alignment film 111 initially aligns liquid crystal molecules.

In FIG. 3, the counter substrate 200 is disposed sandwiching a liquid crystal layer 300 with the TFT substrate 100. On the inner side of the counter substrate 200, a color filter 201 and a black matrix 202 are formed. Since the black matrix 202 is formed overlapped with the picture signal line 71 and the common metal wire 108 in a planar view, the degradation of the contrast due to reflection, for example, from the common metal wire 108 can be reduced.

An overcoat film 203 is formed covering the color filter 201 and the black matrix 202. The overcoat film 203 prevents pigments, for example, from leaking out of the color filter 202 to the liquid crystal layer 300. An alignment film 111 is formed covering the overcoat film 203.

Figure 4:
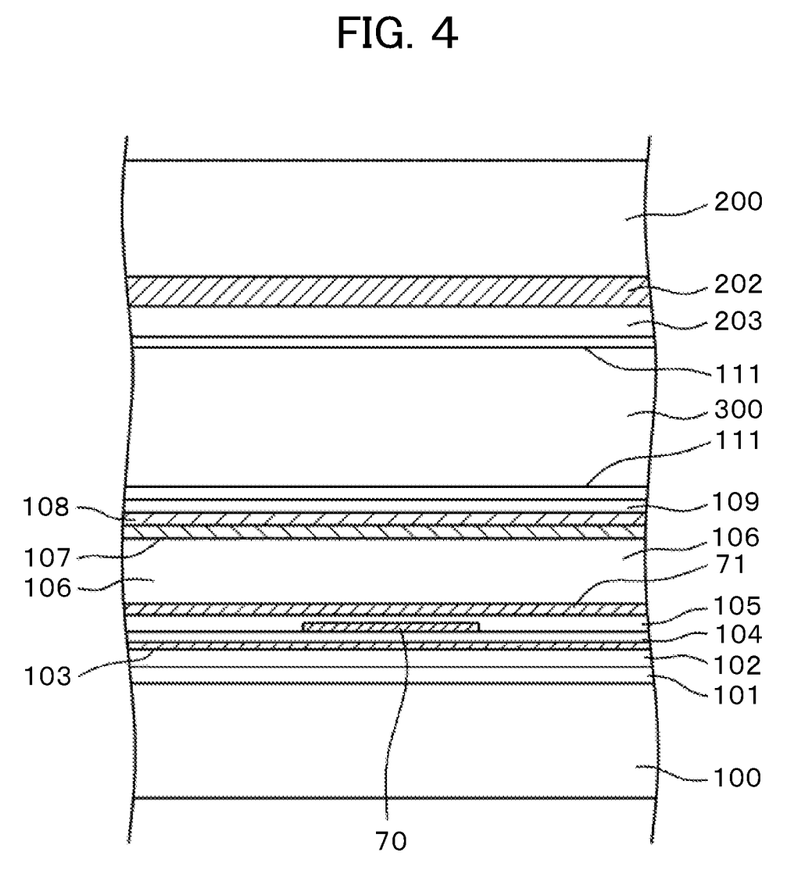
FIG. 4 is a cross sectional view of the liquid crystal display device corresponding to a cross section taken along line B-B in FIG. 2.

FIG. 4 is a cross sectional view of the liquid crystal display device corresponding to a cross section taken along line B-B in FIG. 2. In FIG. 4, the first and the second base films 101 and 102 are formed on the TFT substrate 100 formed of glass. On the second base film 102, the semiconductor layer 103 extends in the lateral direction, which is omitted in FIG. 2. Although not illustrated in FIG. 2, the semiconductor layer 103 bends and extends on the pixel electrode 110 side in FIG. 2, and the semiconductor layer 103 is electrically connected to the pixel electrode 110 through a connection metal electrode. The gate insulating film 104 is formed covering the semiconductor layer 103. On the gate insulating film 104, the scanning line 70 is formed. The scanning line 70 extends in the vertical direction to the paper surface of FIG. 4. The TFT is formed at a portion at which the scanning line 70 intersects with the semiconductor layer 103. On this interesting portion, the scanning line 70 functions as a gate electrode. The scanning line 70 is formed of a Mo alloy, such as MoW, or W alloy, Cr alloy, or Al alloy sandwiched with a refractory metal, or other alloys.

In FIG. 4, the interlayer insulating film 105 is formed covering the scanning line 70, and the picture signal line 71 extends in the lateral direction intersecting with the scanning line 70. In the portion of the cross section taken along line B-B in FIG. 2, the semiconductor layer 103 extends in the same direction on the lower side of the picture signal line 71. In FIG. 4, the organic passivation film 106 is formed on the picture signal line 71, and the common electrode 107 is formed flat on the organic passivation film 106.

On the upper side of the common electrode 107, the common metal wire 108 extends in contact with the common electrode 107 in the same direction as the picture signal line 71. The capacitive insulating film 109 is formed covering the common metal wire 108. The alignment film 111 is formed on the capacitive insulating film 109.

In FIG. 4, the counter substrate 200 is disposed sandwiching the liquid crystal layer 300 with the TFT substrate 100, and the black matrix 202 is formed on the inner side of the counter substrate 200. Since FIG. 4 corresponds to the cross section taken along line B-B in FIG. 2, the black matrix 202 is present on this portion of the counter substrate 200 but the color filter is absent. The other configurations on the counter substrate 200 side are as described in FIG. 3.

Figure 5:
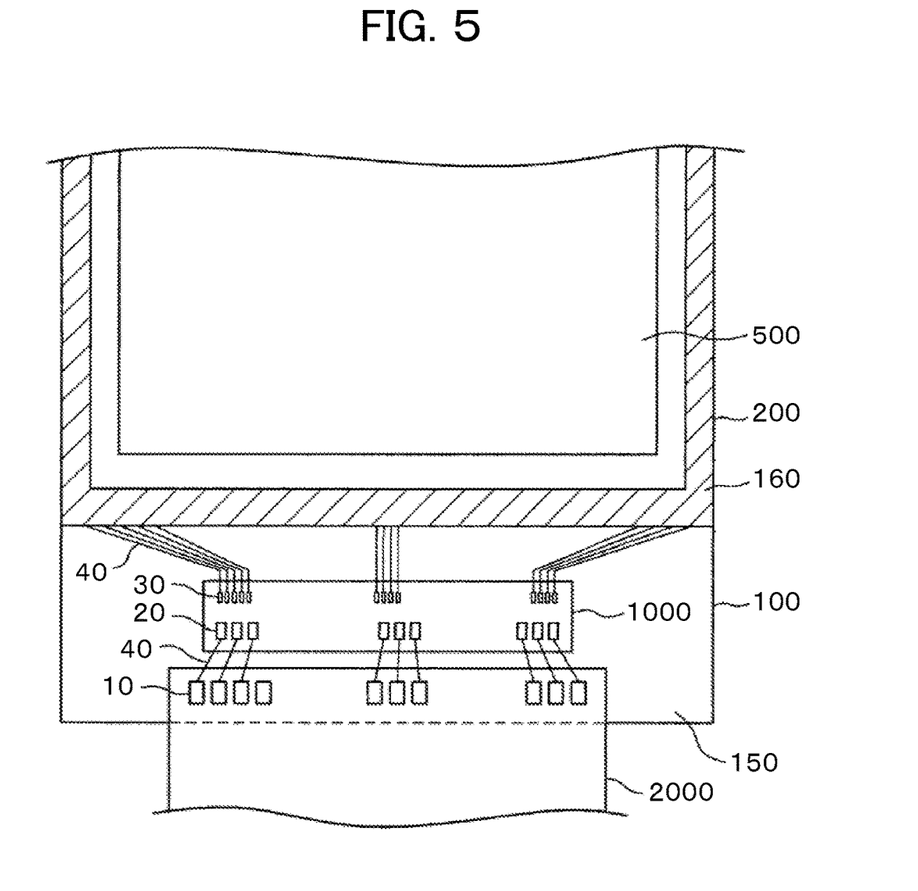
FIG. 5 is an enlarged plan view of a region near a terminal region in FIG. 1.

FIG. 5 is an enlarged diagram of the terminal region 150 in FIG. 1. In FIG. 5, on the portions on the TFT substrate 100 corresponding to the semiconductor chip 1000, COG output terminals 30 and COG input terminals 20 are formed. A large number of the COG output terminals 30 are present because the number of the COG output terminals 30 corresponds to the numbers of the scanning lines 70 and the picture signal lines 71 in the display region 300. The number of the COG output terminals 30 is 1,000 or more, for example. In contrast to this, the number of the COG input terminals 20 is the number corresponding to the number of FOG terminals 10, which is about 20 to 30, for example. Therefore, the COG output terminal 30 is smaller in size and pitch than the COG input terminal 20. Note that, the picture signal lines, for example, in the display region 500 are connected to the output terminals 30 on the semiconductor chip 1000 through the terminal wires 40, and the input terminals 20 on the semiconductor chip 1000 are connected to the FOG terminals 10 on the flexible circuit board 2000 through the terminal wires 40.

In FIG. 5, since the number of the FOG terminals 10 connected to the flexible circuit board 2000 is about 20 to 30, the FOG terminal 10 can be increased in size and pitch more than in the COG output terminal 30. Since the FOG terminal 10 can be provided with a terminal space wider than in the COG input terminal 20 or the COG output terminal 30, the size of the terminal and the pitch between the terminals can be increased more than in the COG input terminal 20 or the COG output terminal 30.

Figure 6:
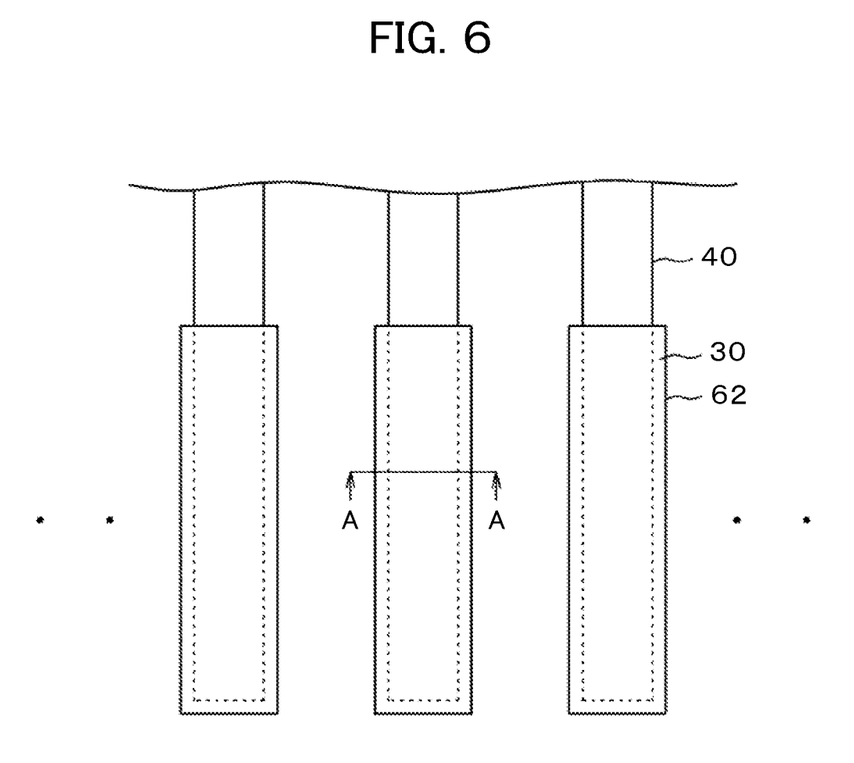
FIG. 6 is a schematic plan view of the arrangement of terminals.
Figure 7:
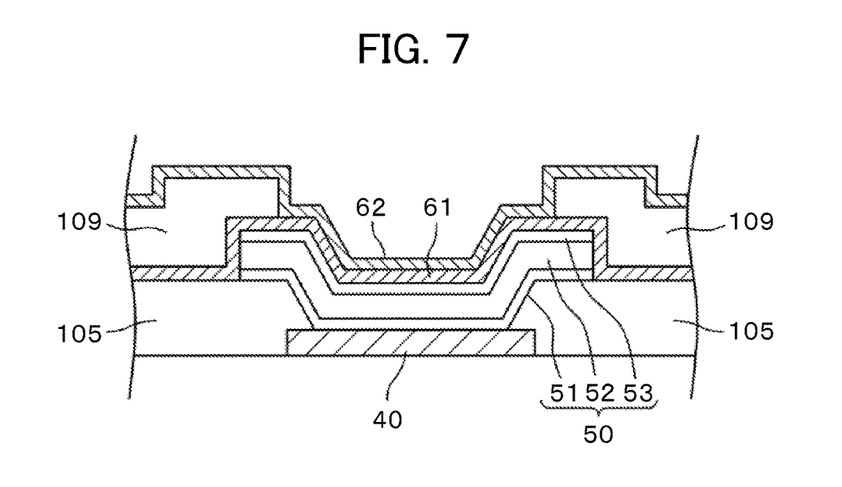
FIG. 7 is a cross sectional view of the terminal of a first comparative example.

FIG. 6 is an enlarged plan view of the terminal portion. FIG. 6 illustrates the case of the COG output terminals 30 by example. Although the sizes are different in the case of the COG input terminals and the FOG terminals, which are the other terminals, their basic configurations are the same. Since FIG. 6 illustrates the terminal portion for explanation, the detailed planar structure is omitted. FIG. 6 only shows the terminal wires 40 extending from the display region and the seconds ITO 62, which are the topmost layer in the terminal portion. FIG. 7 is a cross sectional view of the cross section of the terminal taken along line A-A in FIG. 6 as a first comparative example.

In FIGS. 6 and 7, the terminal wire 40 extends from the display region. The terminal wire 40 is formed on the same layer as the scanning line 70 described in FIG. 4. In this case, the terminal wire 40 is made of a MoW alloy, and its thickness is about 250 nm, for example. The terminal wire 40 is covered with the interlayer insulating film 105 described in FIG. 4. With this configuration, the following is allowed. In the terminal portion, the through hole is formed on the interlayer insulating film 105, and the terminal wire 40 is exposed to connect the semiconductor chip.

However, the connecting portion is unstable when the terminal wire 40 remains exposed. Thus, in order to improve the reliability of connection, various layers are formed in the terminal portion.

In FIG. 7, the interlayer insulating film 105 is formed above the terminal wire 40. However, on the terminal wire 40, the through hole is formed on the interlayer insulating film 105 to expose the terminal wire 40. The thickness of the interlayer insulating film 105 is about 300 to 400 nm, for example. The terminal metal 50 is formed covering the through hole. The terminal metal 50 is formed simultaneously with the materials of the picture signal line 71 using the same materials. In this case, the terminal metal 50 has a configuration in which for example, an Al alloy 52 is sandwiched with Ti, which configures a base metal 51 and a cap metal 53. The thickness of the Al alloy 52 is 500 nm, for example. The thickness of the base metal 51 is 100 nm, for example. The thickness of the cap metal 53 is 100 nm, for example.

When the terminal metal 50 having the Al alloy 52 as a main component in this configuration is exposed to the outside air, the terminal portion is corroded. Thus, in FIG. 7, the surfaces of the terminal metal 50 are covered with the first and the second ITOs 61 and 62. The first ITO 61 is formed simultaneously with the common electrode 107 described in FIGS. 3 and 4. The second ITO 62 is formed simultaneously with the pixel electrode 110. Although the capacitive insulating film 109 is present between the first and the second ITOs 61 and 62, in the terminal portion, the through hole is formed on the capacitive insulating film 109 to connect the first and the second ITOs 61 and 62 to each other.

That is, in FIG. 7, since the terminal metal 50 is protected by the first and the second ITOs 61 and 62, the terminal metal 50 is chemically stable. However, since the two-layer ITO structure of the first and the second ITOs 61 and 62 is formed, the electrical resistance of the surface of the terminal portion is increased. When the resistance of the terminal portion is increased, the operation of the liquid crystal display device is unstable.

Figure 8:
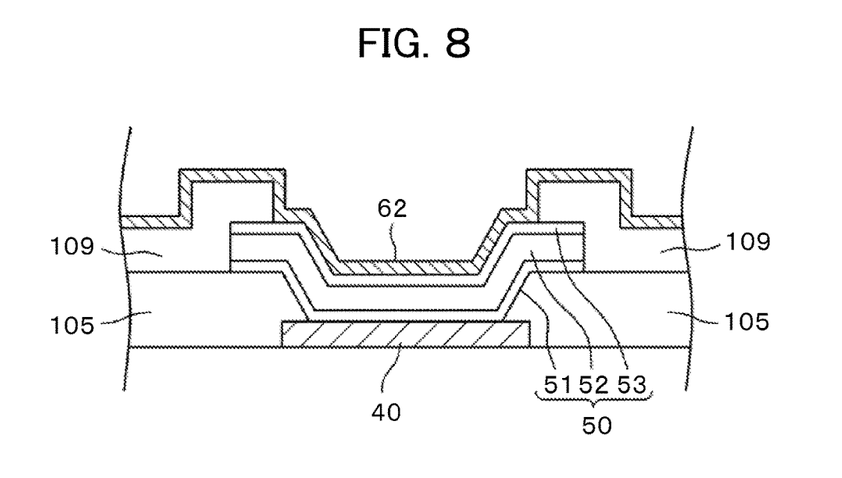
FIG. 8 is a cross sectional view of the terminal of a second comparative example.

FIG. 8 shows a configuration in which the first ITO is omitted from the terminal portion for taking measures against these problems. From the configuration of FIG. 8, since the second ITO 62 is directly connected to the terminal metal 50, an increase in resistance due to the first ITO 61 is absent. This configuration is referred to as a second comparative example. However, the configuration of the second comparative example has problems as shown in FIG. 9.

Figure 9:
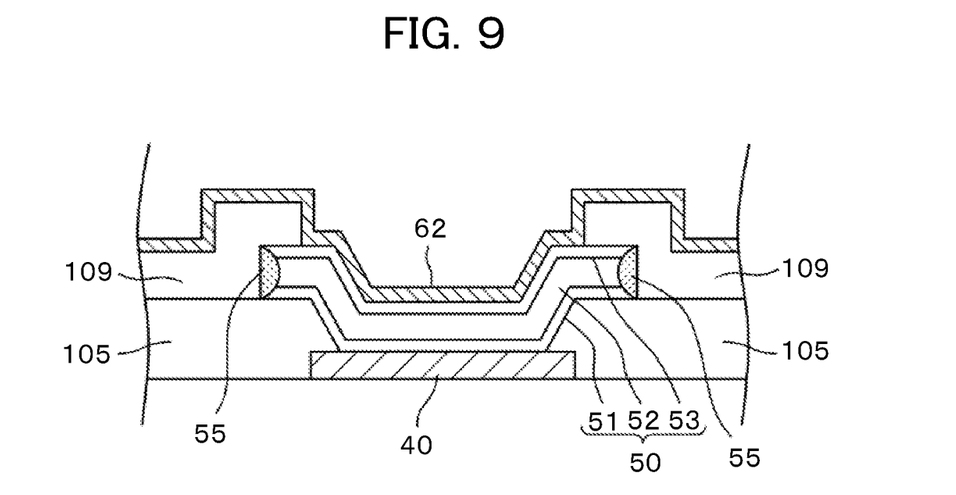
FIG. 9 is a cross sectional view of problems of the terminal of the second comparative example.

FIG. 9 is a cross sectional view of a terminal portion showing the problems of the second comparative example. In FIG. 9, at the end portion of the terminal metal 50, a void 55 is present between the terminal metal 50 and the capacitive insulating film 109. This void 55 is produced when the common metal wire 108 shown in FIGS. 3 and 4 is patterned. That is, the terminal metal 50 is formed with the same materials as the materials of the picture signal line 71. The common metal wire 108 is also formed with the same materials as the materials of the picture signal line 71 or with similar metals. In any cases, an Al alloy is used.

After patterning the terminal metal 50 simultaneously with the picture signal line 71, the end portion of the terminal metal 50 is unprotected. When the common metal wire 108 is patterned in this state, the Al alloy is specifically affected by the etchant for the common metal wire 108 at the end portion of the terminal metal 50, causing a side etch on the Al alloy. After that, when the capacitive insulating film 109 is formed, a corroded portion referred to as the void 55 is produced at the side-etched portion, and hence the terminal portion becomes mechanically or chemically unstable.

Figure 10:
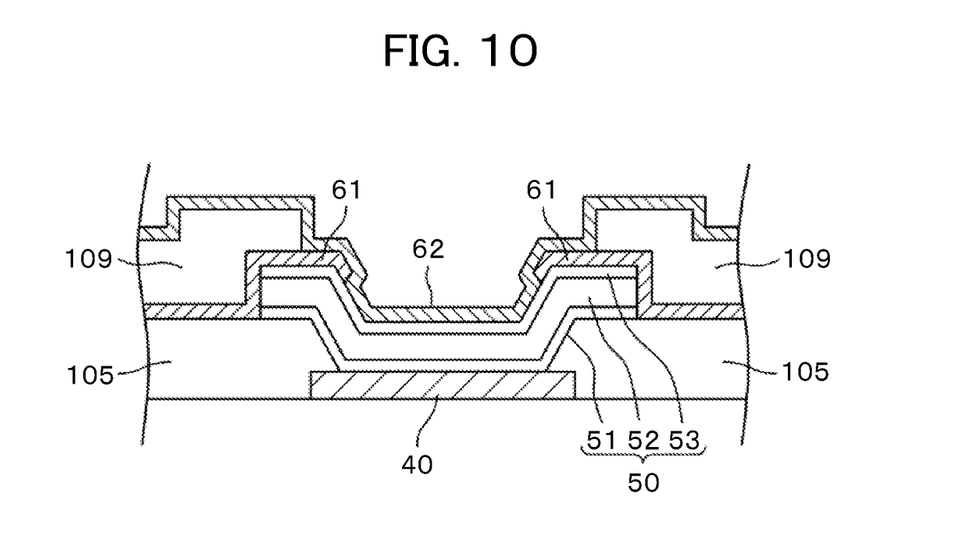
FIG. 10 is a cross sectional view of the terminal of the present disclosure.

FIG. 10 is a cross sectional view of a terminal portion according to the present disclosure, which takes measures against the problems above. In FIG. 10, the description up to forming the terminal metal 50 is similar to the description of FIG. 7. The features in FIG. 10 are the following. After the terminal metal 50 is covered with a first ITO 71, the first ITO 71 is removed at a through hole on the interlayer insulating film 105, and the first ITO 61 is left at the end portion of the terminal metal 50. Since this patterning is performed simultaneously with patterning of the common electrode 107, no processing load is increased.

After that, the capacitive insulating film 109 is formed covering the first ITO 61 and the terminal metal 50, and then a through hole is formed at the terminal portion. After that, the second ITO 62 is formed, and then these layers are patterned so as to form the terminal portion, which is similar to FIG. 7.

With the configuration of FIG. 10, the first ITO 61 is absent at the connecting portion of the terminal portion, and hence an increase in the resistance of the terminal portion can be reduced. On the other hand, the end portion of the terminal metal 50 is covered with the first ITO 61, and hence the phenomenon can be avoided, in which an Al alloy at the end portion of the terminal metal 50 is side-etched in patterning the common metal wire 108. Accordingly, the occurrence of the void 55 as shown in FIG. 9 can be avoided, and a stable terminal portion can be formed.

In FIG. 10, the first ITO 61 is formed up to the midway point of the inner wall of the recess on the terminal metal 50. The first ITO 61 only has to be responsible for covering the end portion of the terminal metal 50. Thus, the range of the first ITO 61 only has to be determined based on the requirements of processing. Alternatively, a portion, at which the influence of the step at the end portion of the first ITO 61 is small, only has to be set to the boundary of the first ITO. However, the first ITO 61 has to be removed from the center part of the terminal.

In the description above, the case of the terminal 30 in FIG. 5 is described by example. However, the present disclosure is also applicable to the terminals 20 and 10 in FIG. 5. On the other hand, in the present disclosure, the first ITO 61 is patterned at the terminal portion, leading to a slight complexity on the terminal structure, compared with the first and the second comparative examples. Accordingly, the present disclosure can also be used only to the terminal with specifically advantageous effects among the terminals 10, 20, and 30.

Figure 11:
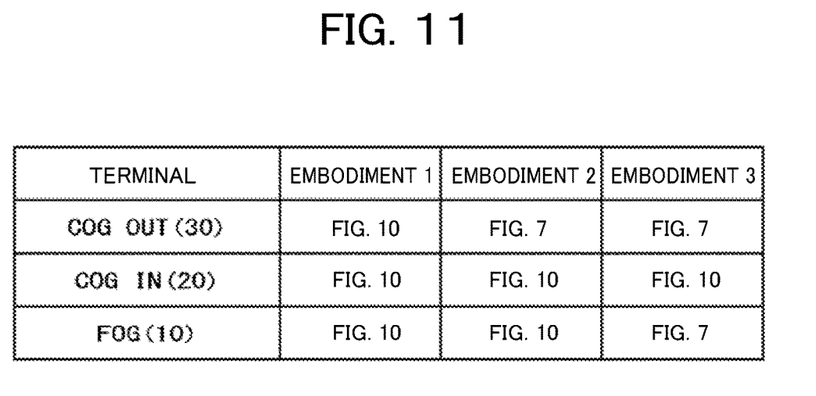
FIG. 11 is a table of exemplary applications of the present disclosure.

FIG. 11 is an example to which the terminal structure of the present disclosure in FIG. 10 is applied. COG OUT in FIG. 11 corresponds to the terminal 30 in FIG. 5, COG IN corresponds to the terminal 20 in FIG. 5, and FOG corresponds to the terminal 10 in FIG. 5. A first embodiment shown in FIG. 11 is the case in which the terminal structure of the present disclosure is applied to all the terminals 10, 20, and 30.

A second embodiment shown in FIG. 11 is the case in which the present disclosure is applied to the terminals 20 and 10 and the terminal 30 has the terminal structure shown in FIG. 7, which is the first comparative example. Since the terminal 30 has a small area, the second embodiment takes into account of the case in which the first ITO 61 is not easily patterned in the terminal. Note that, in the terminal 30, capacitive coupling is present because alternating current signals are mainly transmitted, and thus, direct current resistance does not cause a critical problem in some cases.

A third embodiment shown in FIG. 11 is the case in which the terminal structure of the present disclosure is applied only to the terminal 20 and the terminal structure in FIG. 7, which is the first comparative example, is applied to the terminals 10 and 30. Among the terminals 10, 20, and 30, since the terminal 10 has the largest area, an increase in the resistance of the terminal can be reduced by increasing the area of the terminal. The terminal 30 is as described in the second embodiment. On the other hand, a direct current is sometimes applied to the terminal 20. Since the terminal 20 has the area greater than the area of the terminal 30 but smaller than the area of the terminal 10, the terminal 20 has a great necessity of the present disclosure to be applied.

Note that, in the present specification, an example is shown in which the semiconductor chip and the flexible circuit board are connected to the terminal region. However, a form is possible in which the semiconductor chip is not mounted on the terminal region and all signals, such as picture signals, gate signals, and common signals, are supplied from the flexible circuit board. In this case, in the terminal region, only the terminals corresponding to the FOG terminals 10 are formed. In this form, it is possible that the terminals of the present disclosure coexist with the terminals of the first comparative example in the terminals 10.

In the description above, the description is made by example in which the transparent conductive film is made of ITO. However, oxide conductive films are sometimes used for the transparent conductive film other than ITO. Examples of the oxide conductive film include indium zinc oxide (IZO), antimon tin oxide (ATO), and antimon zinc oxide (AZO). In the case of using these oxide conductive films, the first and the second ITOs 61 and 62 and the like in the present specification only have to be replaced by these oxide conductive films.

In the description above, the liquid crystal display device is described by example. However, the present disclosure is also applicable to organic EL display devices. That is, since the organic EL display device has a configuration in which an organic EL layer is sandwiched between a cathode formed of an oxide conductive film and an anode formed of an oxide conductive film, a configuration can be provided in which the oxide conductive film configuring the anode is the first oxide conductive film in the terminal and the oxide conductive film configuring the cathode is the second oxide conductive film in the terminal.

The cathode is formed as shared by the pixels; however, to prevent the transmittance from being degraded, the oxide conductive film configuring the cathode is formed thin. Consequently, since the resistance of the cathode causes a problem, a metal wire is formed on the cathode with the metal wire being overlapped with the picture signal lines, the scanning lines, or the like in a planar view, and hence a voltage drop in the cathode is prevented. That is, also in the organic EL display device, similar problems are present like the liquid crystal display device described above, and hence the configuration of the present disclosure described above is applicable to the terminal. Accordingly, with the application of the present disclosure, terminals with a small terminal resistance and high reliability can be achieved.

What is claimed is:

1. A display device comprising:
   a display region and a terminal region,
   wherein a terminal formed in the terminal region is formed with a terminal wire electrically connected to a wire in the display region,
   a first insulating film is formed on the terminal wire,
   a through hole is formed in the first insulating film to expose the terminal wire,
   a terminal metal is formed in the through hole to contact with the terminal wire,
   an end portion of the terminal metal is on the first insulating layer,
   the end portion of the terminal metal has a top surface, a side surface, and a bottom surface,
   a first oxide conductive film covers the side surface of the end portion of the terminal metal in a cross-sectional view,
   a second oxide conductive film covers the first oxide conductive film and the terminal metal, and
   the first oxide conductive film has an opening on the terminal metal, and the terminal metal is electrically connected to the second oxide conductive film through the opening.

2. The display device according to claim 1,
   wherein the terminal metal includes an Al alloy layer and the terminal metal is a stack of the Al alloy layer and a metal layer having a melting point higher than a melting point of the Al alloy layer.

3. The display device according to claim 1,
   wherein the terminal metal includes an Al alloy layer, and the terminal metal has a metal layer having a melting point higher than a melting point of the Al alloy on two surfaces of the Al alloy layer.

4. The display device according to claim 1,
   wherein the terminal wire is formed of a metal or an alloy; and
   the first oxide conductive film and the second oxide conductive film are formed of ITO.

5. The display device according to claim 4,
   wherein an end portion of the terminal wire is covered with the first insulating film.

6. The display device according to claim 1,
   wherein between the first oxide conductive film on the end portion of the terminal metal and the second oxide conductive film, a second insulating film is present.

7. The display device according to claim 1,
   wherein the terminal region includes
   a first terminal group connected to a flexible circuit board that externally supplies a signal,
   a second terminal group connected to an input side of a semiconductor chip that drives the display device, and
   a third terminal group connected to an output side of the semiconductor chip;
   and
   the opening of the first oxide conductive film is formed on at least the second terminal group.

8. A liquid crystal display device comprising:
   a first substrate;
   a second substrate; and
   a liquid crystal layer between the first substrate and the second substrate,
   wherein the first substrate has a display region and a terminal region, in the display region, a plurality of scanning lines, a plurality of picture signal lines, and a plurality of pixels region surrounded by the scanning lines and the picture signal lines are formed,
in the pixel region, a pixel electrode and a common electrode are formed,
a terminal formed in the terminal region is formed with a terminal wire electrically connected to the scanning line and/or the picture signal line,
a first insulating film is formed on the terminal wire,
a through hole is formed in the first insulating film to expose the terminal wire,
a terminal metal is formed in the through hole to contact with the terminal wire,
an end portion of the terminal metal is on the first insulating layer,
the end portion of the terminal metal has a top surface, a side surface, and a bottom surface,
a first oxide conductive film covers the side surface of the end portion of the terminal metal in a cross-sectional view,
a second oxide conductive film covers the first oxide conductive film and the terminal metal are formed, and
the first oxide conductive film has an opening on the terminal metal, and the terminal metal is electrically connected to the second oxide conductive film through the opening.

9. The liquid crystal display device according to claim 8, wherein the terminal metal includes an Al alloy layer, and the terminal metal is a stack of the Al alloy layer and a metal layer having a melting point higher than a melting point of the Al alloy layer.

10. The liquid crystal display device according to claim 8, wherein the terminal metal has a layer structure the same as a layer structure of the picture signal line.

11. The liquid crystal display device according to claim 8, wherein the terminal wire is formed of a metal or an alloy; and
the first oxide conductive film and the second oxide conductive film are formed of ITO.

12. The liquid crystal display device according to claim 11,
wherein the terminal wire is formed of a material the same as a material of the scanning line.

13. The liquid crystal display device according to claim 11,
wherein an end portion of the terminal wire is covered with the first insulating film.

14. The liquid crystal display device according to claim 8,
wherein between the first oxide conductive film on the end portion of the terminal metal and the second oxide conductive film, a second insulating film is present.

15. The liquid crystal display device according to claim 8,
wherein the first oxide conductive film is formed of a material the same as a material of the common electrode, and
the second oxide conductive film is formed of a material the same as a material of the pixel electrode.

16. The liquid crystal display device according to claim 8,
wherein on the common electrode in the display region, a metal wire including an Al alloy is formed in contact with the common electrode.

17. The liquid crystal display device according to claim 16,
wherein the metal wire and the terminal metal are formed of materials that are the same.

18. The liquid crystal display device according to claim 8,
wherein the terminal region includes
a first terminal group connected to a flexible circuit board that externally supplies a signal,
a second terminal group connected to an input side of a semiconductor chip that drives the display device, and
a third terminal group connected to an output side of the semiconductor chip;
and
the opening of the first oxide conductive film is formed on at least the second terminal group.

* * * * *